Nov. 2, 1954                F. J. CHATELAIN                2,693,097
     ELECTRICAL CONTROL CIRCUIT TO PROVIDE HIGH-TEMPERATURE
            WATER FOR PREDETERMINED WASH PERIODS
                      Filed Nov. 6, 1950
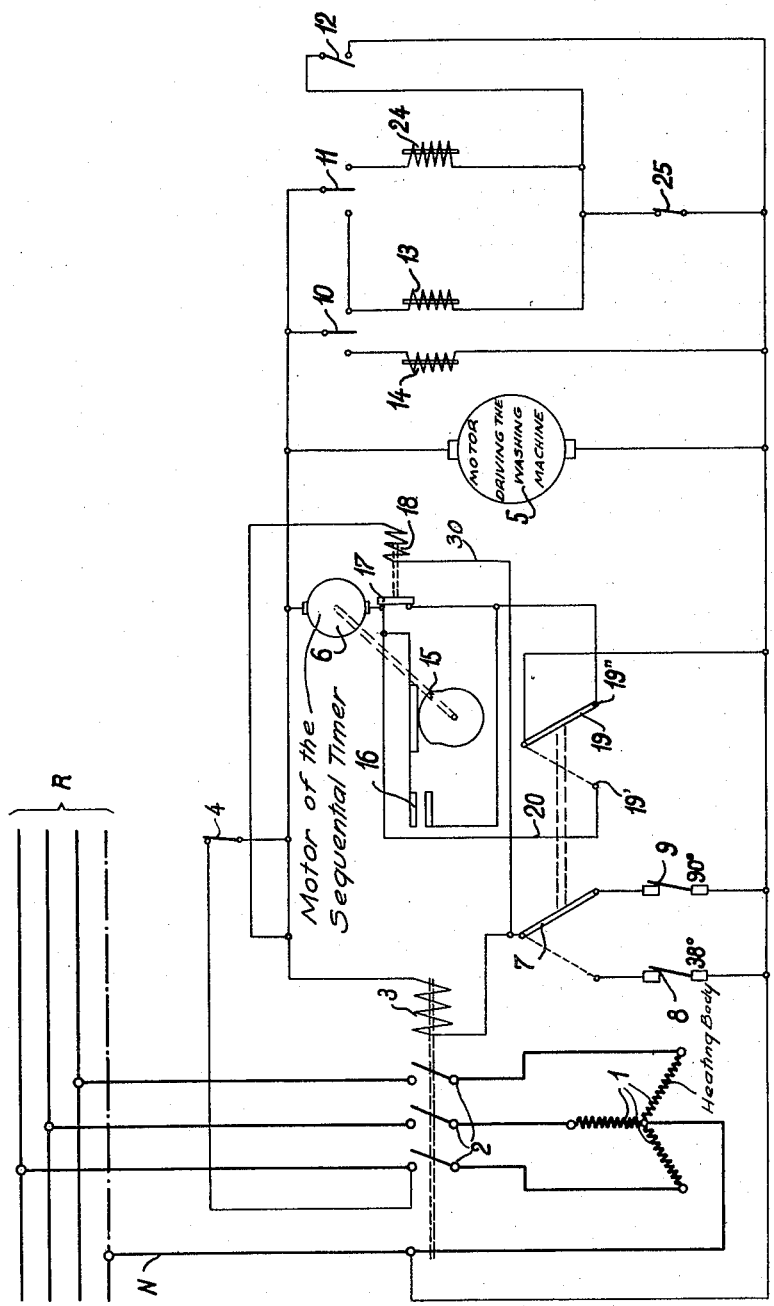
Inventor:
Frédéric J. Chatelain
by: J. Delattre Seguy
                Attorney

2,693,097

ELECTRICAL CONTROL CIRCUIT TO PROVIDE HIGH-TEMPERATURE WATER FOR PREDETERMINED WASH PERIODS

Frédéric J. Chatelain, Geneva, Switzerland

Application November 6, 1950, Serial No. 194,285

Claims priority, application Switzerland March 10, 1950

1 Claim. (Cl. 68—12)

The present invention relates to an electrically operated automatic washing machine comprising an electric sequential timer to ensure that the phases of the washing process, that is to say washing, multiple rinsing and multiple drying, will follow one another automatically.

The object of the invention is to provide a novel motor driven, sequential timer in washing machines provided with heating means for the water, whereby an automatic controlling device is adjoined to the machine and is adapted to switch off the motor of the sequential timer during the heating of the water up to a temperature predetermined for a given phase of the washing process which, upon activation of a thermostat, causes the automatic control device to switch said motor on again, the washing process thus continuing automatically.

Another object of the invention is to provide in a heating control circuit for energizing the heating body, a bipolar change-over switch, which may be manually connected either to a first contacting thermostat adjusted to a relative high temperature or to a second contacting thermostat adjusted to a lower temperature, convenient for delicate fabrics, a common terminal of said change-over switch being connected to an automatic control device intended for actually switching off the motor of the sequential timer, only during the heating period of the water up to a relatively high temperature, while when putting the change-over switch onto the second contacting thermostat, the feeding circuit of the motor remains closed as soon as the main switch is turned on.

Other objects and advantages of the present invention are more fully hereinafter described and claimed.

The accompanying drawing shows by way of example the simplified diagram of the connections of an electric washing machine according to the invention.

In this diagram the reference numeral 1 indicates the heating body of a washing machine, which is connected to a supply network R by normally open multiple switches 2 controlled by a relay or electro-magnet 3 which the operator excites by turning on a main switch 4 which sends current both into a motor 5 which drives the agitator drum of the washing machine and also into a motor 6 of a sequential timer which ensures that the phases of the washing process, that is to say washing with very hot water, rinsing with luke-warm water and centrifugal drying at high speed, will succeed one another automatically.

The coil of the relay 3 is connected to a neutral wire N of the supply network by means of a change-over switch 7 having two selective working positions and ground return lines, one line passing through a normally closed thermostat 8 adjusted to open at 38° C., the temperature for delicate fabrics, and the other passing through a normally closed thermostat 9 adjusted to open at 90° C., the temperature for washing articles of laundry which will not be damaged by treatment at a high temperature.

The motor 6 of the sequential timer actuates a cam shaft, not shown, the various cams of which at the right times actuate switches 10, 11 and 12 which energize the following electro-magnets for starting the operation of the indicated services: 13 for opening a valve that admits water into the machine, 14 for opening a drain valve which is effected automatically, and 24 for shifting a change-speed clutch to cause high speed operation of a washing drum (not shown) in order to effect centrifugal drying. When closed, the switch 12 permits operation of the above circuits through the electro-magnets 13 and 24 even though, after draining away wash water in preparation for a preliminary rinse, a large amount of suds remains in a float-switch housing (not shown) and prevents the closing of a float-controlled switch 25, this switch having opened when the tub was filled with wash water.

The cam shaft actuated by the motor 6 carries another cam 15 the function of which is to open a holding switch 16 connected into a return circuit of said motor 6 in shunt with a normally closed relay-operated switch 17. The latter is mounted on the armature of an auxiliary relay or electro-magnet 18 connected in parallel with the relay 3 controlling the heating body. As an alternative, the switch 17 may be carried by the armature of the relay 3 controlling the heating body. A line 30 connecting the coil of the auxiliary relay 18 to the network and to the change-over switch 7 forms a control circuit for temporarily stopping the operation of timer motor 6 during a higher-temperature wash, if the heating body 1 is activated while cam 15 is holding the switch 16 open.

The change-over switch 7 is mechanically connected to a change-over contact blade 19 which may occupy either a position on terminal 19′ in which the return of the feeding circuit of the motor 6 to the neutral wire is ensured, independently of the switches 16 and 17, by means of a by-pass conductor 20, or a second position on terminal 19″ in which this return is provided in series with the switches 16 and 17.

To prepare for and operate the successive phases of the washing the machine described above functions as follows:

Before or after the preliminary washing of the articles of laundry, the completion of which process may be indicated by the complete cessation of the action of the machine, both of the drum and of the heating body, the operator places the change-over switch 7 on one of the contacts 8 and 9 depending on whether he is washing delicate fabrics or, on the other hand, fabrics which have to be washed at a high temperature. Then he closes the main switch 4 for the washing proper and introduces the necessary cleaning products into the container. Closing the main switch 4 starts the operation of the timer motor 6 (through either the by-pass conductor 20 or the holding switch 16, depending on the position of the switches 7 and 19) to fill the machine with wash water and then to actuate the cam 15 until it opens the switch 16. Since closing the main switch 4 also energized the coil of electro-magnet 3 to close the normally open switches 2 to start the heater 1, and the coil of the relay 18 to open the switch 17, the timer motor 6 either continues to operate, if connected to the by-pass conductor 20, or ceases to operate, if connected to the circuit containing the switch 16, now open. If the change-over switch 7 has been placed on the contact 9, the blade 19 will contact terminal 19″ and the circuit of the motor 6 of the sequential timer includes either the holding switch 16 or the relay-operated switch 17, both of which are now being held in open position, in order to keep the timer motor 6 from operating while the wash water is being heated to 90° C. Of course, from the moment the operator turns on the main switch 4, the entire washing process, that is to say washing, multiple rinsing and multiple centrifugal drying, is effected automatically, up to and including complete cessation which is also automatic. The change-over blade 19 having been, as assumed, set in the position 19″, the water contained in the machine becomes continually hotter until it reaches 90° C. At this moment the thermostat 9 leaves its contact and breaks the circuit through the coil of the relay 3 and the coil of the auxiliary relay 18 so as to open the heater switches 2 and close the switch 17. The circuit of the motor 6 of the sequential timer is thus restored through 17, 19″ and 19, so that said sequential timer automatically begins to move again and will continue to move unless such movement is interrupted as hereinafter explained, and washing at high temperature continues for the exact period assigned to it, the actual duration of this period, however, including any additional time required for reheating the wash water, as explained later. At the end of this period the cam 15 disengages the holding contact 16 which then closes to form a circuit for the motor 6 that is not affected by the position of the relay-operated switch 17. Thus the shape and the arrangement of the cam 15 are such that whenever the machine begins a higher temperature washing operation, the cam keeps the holding contact 16 open so as to permit the breaking of the feeding circuit of the motor 6 in a manner now to be described.

In the event that, during the washing proper set at a predetermined temperature of 90° C., the actual temperature of the water falls substantially under 90° C., while cam 15 still holds switch 16 open, then the thermostat 9 closes the control circuit of the heating relay 3 to reheat the wash water, and at the same time energizes the coil of the auxiliary relay 18, thus breaking the feeding circuit of the motor 6 by opening the switch 17. Thus the motor 6 stops until the water again reaches the temperature of 90° C. Under these conditions, the washing operation over a predetermined period only uses water at a temperature of at least 90° C., but the actual duration of the washing cycle will equal such predetermined period plus the total time that reheating of the wash water causes the timing function of motor 6 to be interrupted.

If the change-over switch 7 has been connected to the lower temperature thermostat 8, the blade 19 is in the position 19'; and the ground return of the feeding circuit of the motor 6 then comprises the by-pass line 20, contact 19' and blade 19. Thus, neither the cam-operated switch 16, nor the relay-operated switch 17 can affect the feeding circuit of the motor 6, which will continue without interruption to time the washing operation over a predetermined period, whether or not, during such period, the thermostat 8 cuts out in order to cause reheating of the wash water.

While the above disclosed washing machine comprises an electric heating body, some other heating means, such as gas, could be substituted for electricity, as shown in U. S. Patent No. 2,279,656, issued April 14, 1942, to J. W. Chamberlin et al. In such a modification the heating resistors 1 would be replaced by one or more burners, the ignition and putting out of which would be controlled by means of the relay 3, adapted to actuate suitable cocks provided on the burners, instead of the multiple switches.

While in the foregoing there has been shown and described the preferred embodiment of this invention it is to be understood that minor changes in the details of construction, combination and arrangement of parts may be resorted to without departing from the function and scope of the invention as claimed.

I claim:

An automatic washing machine having a sequential timer, an electric motor driving the timer, and electric circuits arranged to control said motor and washing, rinsing and drying cycles according to the sequence imparted by said timer, a heating body adapted to heat the water contained in the machine, a source of electrical energy, a normally open switch having terminals connected respectively to one side of said source and to said heating body, a heating control circuit connected to said source, comprising a first contacting thermostat adjusted to a higher washing temperature, and a second contacting thermostat adjusted to a lower temperature, a manually operable bipolar change-over switch adapted to be connected either to the higher temperature or to the lower temperature contacting thermostat, and a first electro-magnet the armature of which is adapted for closing said normally open switch of the heating body and the coil of which is connected to said source in series with said change-over switch, an auxiliary change-over contact blade in operative relation with said bipolar change-over switch, said blade being permanently connected to the other side of said source, two auxiliary terminals connectible through a motor terminal to said one side of said source and adapted to be selectively connected by said auxiliary change-over contact blade in accordance with the connection of said change-over switch to either the first or the second of said two contacting thermostats, a by-pass conductor directly connecting said motor terminal to one of said auxiliary terminals, a normally closed switch connecting said motor terminal to the other of said auxiliary terminals, a relay or second electro-magnet for temporarily opening said normally closed switch, said relay having its coil connected in parallel with the coil of said first electro-magnet and to the common terminal of said bipolar change-over switch, a cam-operated holding switch connected across said motor terminal and said other auxiliary terminal in shunt relation to said normally closed switch, and an adjustable cam driven by said motor and adapted to open said holding switch for a predetermined washing period at the higher temperature, said motor being temporarily stopped whenever said higher temperature thermostat closes so as to energize the coil of said first electro-magnet to close said normally open switch to activate said heating body, and so as to energize the coil of said relay or second electro-magnet to open said normally closed switch to stop said motor, whereby the time required for heating the wash water to maintain the higher water temperature does not advance said cam, and whereby said predetermined washing period at the higher temperature does not include the time required to heat the water to the higher temperature and the time required to reheat the water to maintain the higher temperature.

References Cited in the file of this patent

UNITED STATES PATENTS

| Number | Name | Date |
|---|---|---|
| 2,091,838 | Staak | Aug. 31, 1937 |
| 2,173,564 | Osuch | Sept. 19, 1939 |
| 2,208,662 | Clark | July 23, 1940 |
| 2,279,656 | Chamberlin et al. | Apr. 14, 1942 |
| 2,328,073 | Hanney | Aug. 31, 1943 |
| 2,563,738 | Oliver | Aug. 7, 1951 |